United States Patent [19]

Deutsch et al.

[11] Patent Number: 4,636,889
[45] Date of Patent: Jan. 13, 1987

[54] MAGNETIC-TAPE CASSETTE APPARATUS WITH REVERSING TAPE DIRECTION

[75] Inventors: Armin Deutsch; Henricus M. Ruyten, both of Wetzlar, Fed. Rep. of Germany

[73] Assignee: U.S. Philips Corporation, New York, N.Y.

[21] Appl. No.: 593,798

[22] Filed: Mar. 27, 1984

[30] Foreign Application Priority Data

Apr. 2, 1983 [DE] Fed. Rep. of Germany ....... 3312134
Apr. 11, 1983 [NL] Netherlands .................. 8301265

[51] Int. Cl.$^4$ .................. G11B 5/008; G11B 15/28; G11B 15/44
[52] U.S. Cl. .................. 360/96.2; 360/74.1; 360/105
[58] Field of Search .................. 360/90, 93, 96.1–96.3, 360/137, 61, 74.1, 105, 104; 242/201, 206–209

[56] References Cited

U.S. PATENT DOCUMENTS 4,209,812  6/1980  Umezawa et al. ............. 360/96.3
4,379,314  4/1983  Kamimura et al. ........... 360/96.5
4,504,877  3/1985  Tsuchiya ...................... 360/96.2

FOREIGN PATENT DOCUMENTS

54-163008  12/1979  Japan ............................ 360/137

Primary Examiner—Stuart N. Hecker
Assistant Examiner—Benjamin E. Urcia
Attorney, Agent, or Firm—David R. Treacy

[57] ABSTRACT

A tape transport mechanism has a device for reversing the direction of tape transport, which pivots the head mounting plate so that either one of two pressure rollers pinches the tape against a respective capstan. The head mounting plate is guided by systems of guide pins engaging guide slots, each of the systems having at least one corresponding pin and slot to each side of a magnetic head, in the direction of a line between the two capstans. At least one guide slot to each side of the head has two legs or branches, one of which is shorter than the other. A control device causes a guide pin to one side of the head to be in the short leg or branch, while the guide pin to the other side of the head is in the long leg or branch, the head plate then pivoting about the guide pin which is in and abuts the end of the short leg or branch.

10 Claims, 9 Drawing Figures

MAGNETIC-TAPE CASSETTE APPARATUS WITH REVERSING TAPE DIRECTION

BACKGROUND OF THE INVENTION

The invention relates to a magnetic-tape-cassette apparatus comprising a device for reversing the tape-transport direction. The magnetic tape is passed along at least one magnetic head arranged on a pivotable head-mounting plate which is movable towards the cassette. The plate positions one of the two pressure rollers arranged on it by a controlled pivotal movement against the associated capstan and thereby defines the direction of tape transport.

Such a device is known and is used in the magnetic-tape-cassette apparatus sold under the trademark Grundig, type WKC 3 3857 VD. This known apparatus employs a reversible drive system which in operation rotates actuating discs provided with projections. Depending on the position of these projections the heat-mounting plate, as it travels towards the cassette, can abut with projections which are situated at different distances from the front wall of the cassette, so that the relevant pressure roller, which determines the tape-transport direction, is applied to the capstan.

The use of a reversible drive system for the actuation of the head-mounting plate is more expensive and more intricate than the use of a non-reversible drive system. In principle, a non-reversible motor is not suitable for us in the known reversible drive apparatus.

SUMMARY OF THE INVENTION

It is the object of the invention to provide a device for reversing the tape-transport direction in a magnetic tape apparatus, the pivotal position of the head-mounting plate being determined by the movement of the head-mounting plate relative to the cassette.

According to the invention this object is achieved by providing guide slot systems arranged on the frame of the apparatus on both sides of the magnetic head, guide pins arranged on the head-mounting plate, movable in the guide slot systems towards an imaginary capstan connecting line, and control means which cooperate with the guide-slot systems and which guide the guide pins in the guide-slot systems in such a way that, after each movement of the head-mounting plate away from the connecting line, during a subsequent movement towards the connecting line the guide pins alternately move in the one or the other guide-slot system into a guide slot branch having a stop edge which blocks the travel of the relevant guide pin. This permits only that pressure roller on the pivoting head-mounting plate, whose associated guide pin is guided into a path which is not blocked, to be able to move towards the associated capstan, thereby determining the direction of tape transport.

The principal advantage of this device is that the head-mounting plate itself, as it moves away from the cassette and travels forwards again towards the cassette, mechanically positions a stop, by the cooperation of the guide pins with parts of the guide-slot systems The control means ensure that the stop changes mechanically from one side to the other side in a reliable manner, so that always only one pressure roller of the head-mounting plate can be applied to the associated capstan, thereby determining the tape-transport direction. A further advantage of this device is that the movement of the head-mounting plate and the alternate application of the pressure rollers to the capstans can be obtained by means of a non-reversible motor, enabling the drive mechanism to be manufactured in an economic manner.

In a preferred embodiment of the invention, the guide-slot systems comprise fork-shaped guide slots in the frame. The two systems are mirror-inverted relative to each other, and each comprise two branches corresponding to the fork tines, one of the branches being shorter than the other, and a central run-in branch which corresponds to the fork handle opening into the fork base. In this way the pivotal movement of the head-mounting plate is controlled by simple means.

The control means comprise a control plate which is movable between two end positions parallel to the capstan interconnecting line and is formed with U-shaped guide slots on both sides of the magnetic head. In each end position of the control plate the respective u-shaped slots can be at least partly in register with the corresponding fork-shaped guide slots in the frame, the distance between the branches of the U-shaped guide slots being smaller than that between the branches of the fork-shaped guide slots. Pointed tongues separate the branches of the U-shaped guide slots, for alternately guiding the guide pins in the short or long branches. In the end position of the control plate, the tongues are situated in a laterally offset position relative to the run-in branches reckoned in the direction of movement of the control plate.

In this way the only part which dictates the pivotal direction of the head-mounting plate is the control plate. This part has only a small height, so that this construction is very suitable for use in equipment with a flat construction, such as for example car cassette players. The guide pins may simply be constructed as thumb-tack shaped limbs or as elastic tongues on whose free ends pin-shaped projections are arranged. The smaller distance between the branches of the U-shaped slots in the control plate ensures that the guide pins, which engage the run-in branches when the head-mounting plate is withdrawn, always meet the tongues of the control plate when they are in the laterally offset position, thereby guaranteeing correct guidance of the guide pins in the desired direction.

In a further preferred embodiment of the invention the control plate is provided with at least one stop and the apparatus comprises a stop button and an actuating rod which is connected to this button. The rod is provided with a projection which, upon actuation of the stop button, abuts the stop and always moves the control plate into one of the end positions. This results in a preferred position of the control plate, so that after actuation of the stop button the magnetic tape is always moved in only one direction of tape transport. In the case of a car cassette player the stop button may also function as eject button, which ensures that the tape is always driven in one specific tape-transport direction after depression of the eject button, removal of the cassette and insertion of a new cassette.

In a different preferred embodiment of the invention the guide slot systems comprise U-shaped grooves formed in the frame. Each of these grooves has a short and a long branch and is provided with a double groove in the portion connecting the branches, and the control means are constructed as guide surfaces situated on the bottom of the grooves. The guide surfaces are upwardly inclined relative to the bottom and terminate in guide portions, which after each withdrawal of the head-mounting plate and the subsequent forward movement towards the capstan interconnecting line allow the guide pins to move via one only of the connecting grooves from the short branch into the long branch and, upon the next backward and forward movement, to move via the other connecting groove from the long into the short branch. The short and long branches of the two grooves are situated in such a way relative to each other that, during the backward and forward movement of the head-mounting plate, one of the guide pins moves into a short branch while the other guide pin moves into the long branch. During the subsequent backward and forward movement the one guide pin moves into the long and the other guide pin moves into the short branch.

These guide slots systems do not require the use of any moving control means. The control means in the form of upwardly inclined guide surfaces and the guide portions can be formed integrally with the frame by injection molding, for example by outsert-molding. The only movable elements are the guide pins on the head-mounting plate.

Embodiments of the invention will be described in more detail, by way of example, with reference to the drawings.

DESCRIPTION OF THE PREFERRED EMBODIMENTS

Figure 1:
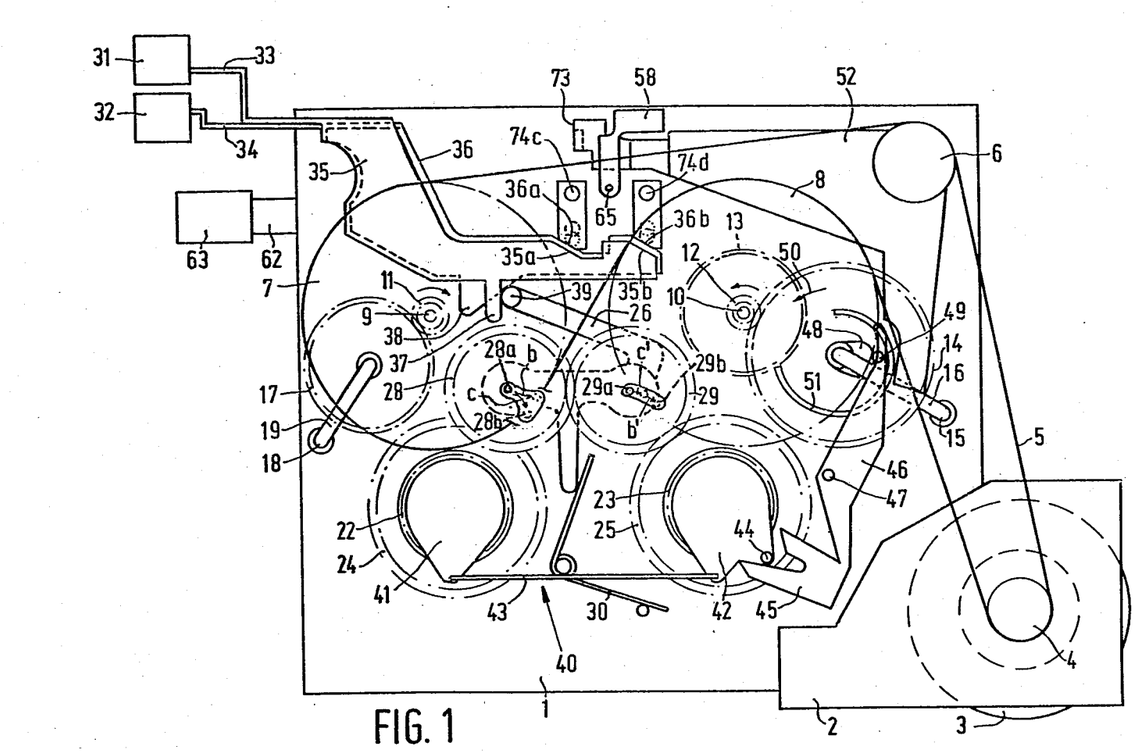
FIG. 1 is a view of the driving side of the magnetic-tape-cassette apparatus in accordance with the invention in a first embodiment.

The magnetic-tape-cassette apparatus in accordance with the invention, as shown in FIG. 1, comprises a frame 1 which carries a non-reversible drive motor 3 on a support 2. The drive wheel 4 of the motor 3 drives a belt 5, which is passed over a guide roller 6 and flywheels 7 and 8 in such a way that the flywheels rotate in opposite direction.

The flywheels 7 and 8 are rotatably journalled in the frame 1. The flywheel 7 is rigidly connected to a capstan 9 and the flywheel 8 is rigidly connected to a capstan 10. Moreover, the flywheel 7 is connected to a gear wheel 11 and the flywheel 8 is connected to a gear wheel 12. A further gear wheel 13 is arranged parallel to and coupled by a slipping clutch (not shown) to the gear wheel 12 so as to be rotatable relative to the flywheel 8. A switching wheel 14 in the form of a gear wheel is constantly in mesh with the gear wheel 12 on the flywheel 8. This gear wheel 14 is arranged to be pivotable about a spindle 15. The spindle 15 carries a pivotal arm 16, shown schematically in FIG. 1, on which the switching wheel 14 is mounted for rotation.

In a similar way a gear wheel 17 is constantly in mesh with the gear wheel 11. The gear wheel 17 is arranged to be pivotable about a spindle 18 by means of a pivotal arm 19, which is shown schematically.

Figure 3:
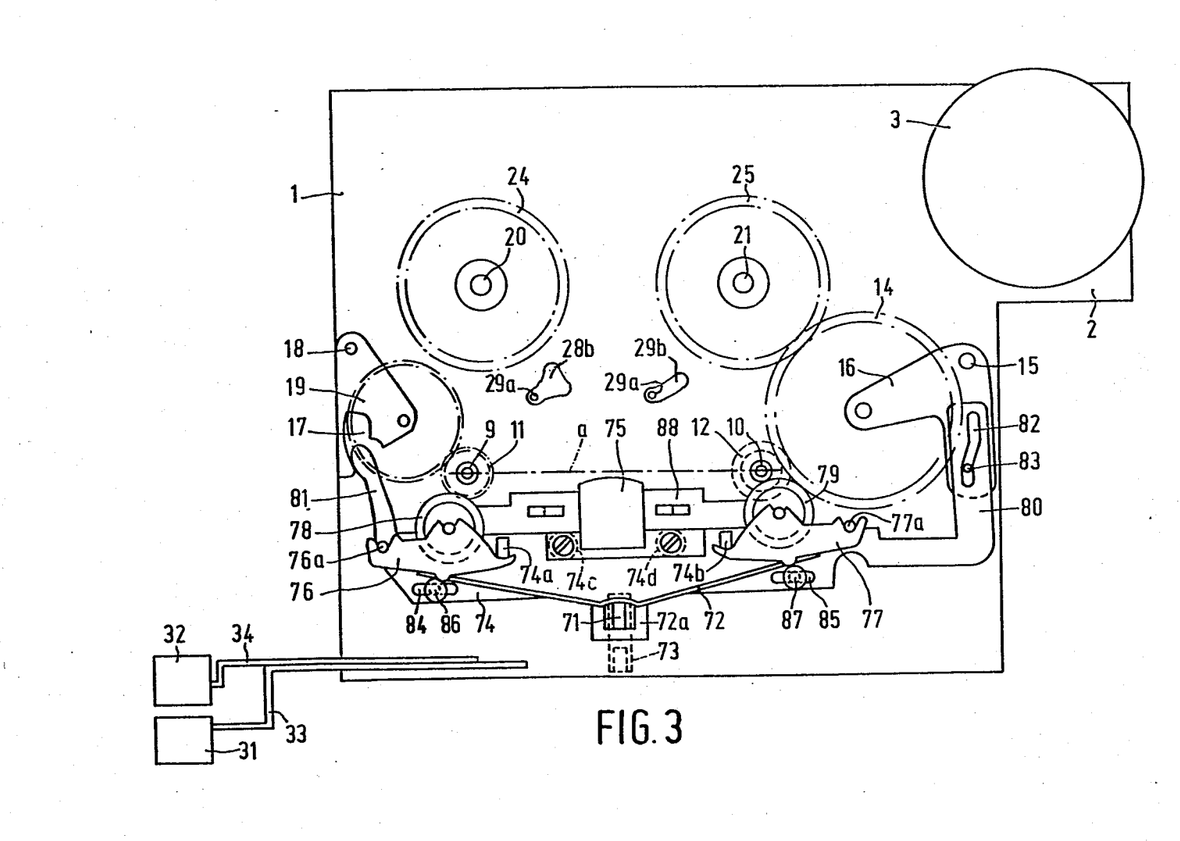
FIG. 3 is a view of the magnetic-head side of the magnetic-tape-cassette apparatus in a first tape-transport direction.
Figure 4:
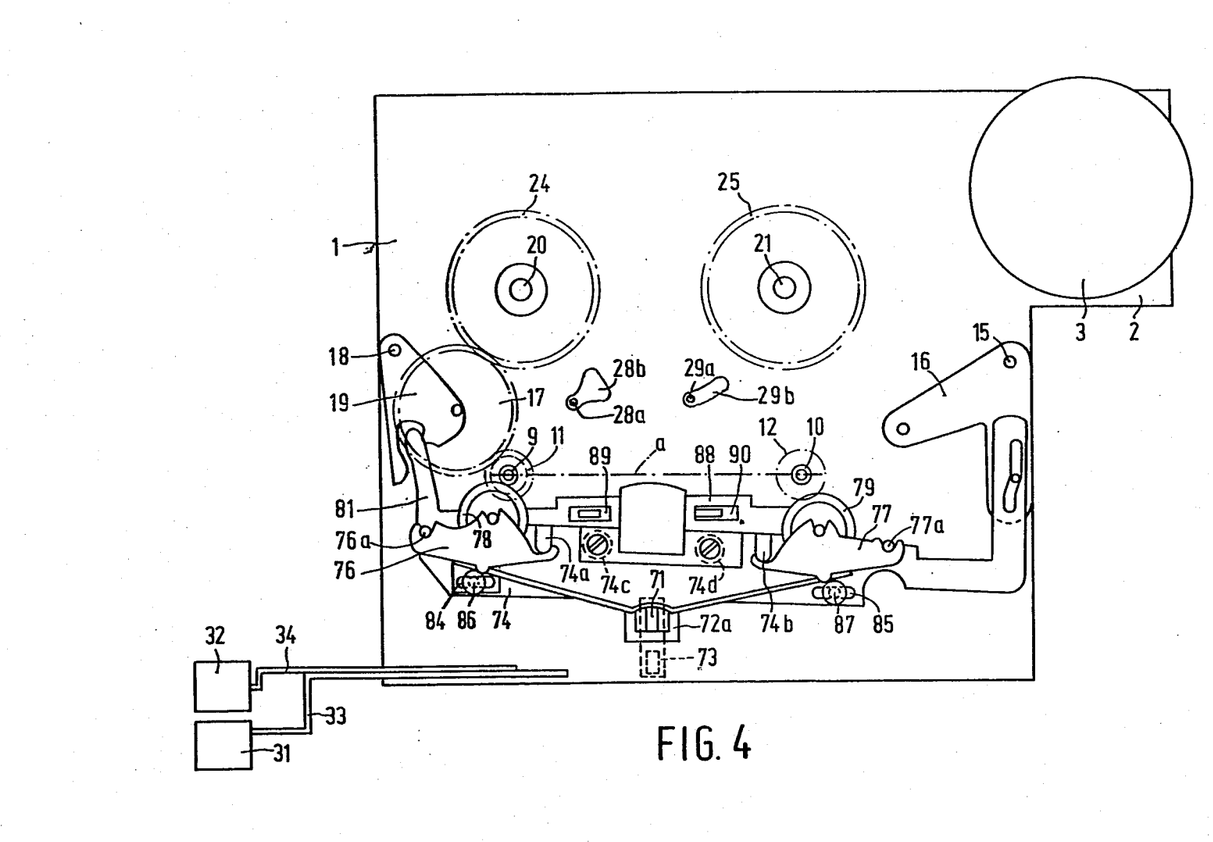
FIG. 4 is a view of the magnetic-tape-cassette apparatus similar to that in FIG. 3, but in a second, opposite tape-transport direction.

As is also shown in FIGS. 3 and 4, winding spindles 20 and 21 are rotatably journalled in the frame 1. These winding spindles 20 and 21 are rigidly connected to fast-wind wheels 22, 23. Play wheels 24, 25 are coupled to the winding spindles 20, 21 by slipping clutches.

FIG. 3 shows how the play wheel 25 is driven by the gear wheel 12 via the switching wheel 14. In a similar way FIG. 4 shows how the play wheel 24 is driven by the gear wheel 11 via the gear wheel 17.

A member 26, which is movably guided in the frame 1, carries two gear wheels 28, 29 adjacent each other. A spring 30 pushes the member 26 towards the initial position shown in FIG. 1. The member 26 carries pins 28a, 29a, which are movably guided in a triangular hole 28b and a slot 29b, respectively, in the frame 1.

For fast forward and reverse winding there are provided two buttons 31 and 32. These buttons 31, 32 are connected to slides 35, 36 by the actuating or push-button rods 33 and 34. These slides 35 and 36 cooperate with the member 26. For this purpose the slide 35 is formed with a projection 37 and the slide 36 is formed with a guide surface 38. The projection 37 and the guide surface 38 cooperate with a pin 39 on the member 26. The slides 35, 36 further comprise guide surfaces 35a, 35b and 36a, 36b, respectively, which can operate on pins 74c, 74d of a head plate 74 (see also FIGS. 3, 4).

When as a result of the depression of the button 31 the projection 37 is urged against the pin 39 on the member 26, the gear wheel 29 first comes into mesh with the gear wheel 13. The pins 28a and 29a then move in the hole 28b and the slot 29b, respectively, in the direction indicated by the arrows b and c' respectively. As the movement continues, the pin 29a moves further in the slot 29b in the direction indicated by the arrow b', as a result of which the gear wheel 29 also meshes with the fast-wind wheel 23. The winding spindle 21 is now driven with a higher speed and the magnetic tape is wound rapidly. If the other fast-wind button 32 is depressed the guide surface 38 slides past the pin 39. The pins 28a and 29a then move in the directions indicated by the arrows c and c' respectively, so that the gear wheel 29 meshes with the gear wheel 13 and the gear wheel 28 meshes with the gear wheel 22. In this way the other winding spindle 20 is now driven for fast winding.

When the head mounting plate 74 has reached a playing position, the pins 74c, 74d assume one of the broken-line-positions shown in FIG. 1. The positions correspond to the positions shown in FIGS. 3 and 4, respectively. Actuating the pushbutton rods 33 and 34, respectively, causes the pins 74c, 74d and hence the head mounting plate 74 to be moved by the guide surfaces 35a, 35b and 36a, 36b, respectively, to the left so that a sound head 75 and pressure rollers 78, 79 are lifted from the magnetic tape.

A tape stoppage detection means 40, comprising two discs 41, 42 and a connecting rod 43, is connected to the winding spindles 20, 21 through slipping clutches. A pin 44 arranged on the disc 42 engages a switching fork 45. The switching fork 45 is arranged on a switching member 46, which is pivotable about a pivot 47 (see also FIGS. 2A and 2B). The switching wheel 14 carries a central slightly elliptical projection 48. The switching member 46 extends over the switching wheel 14 and carries a pin 49, which when the switching member 46 has pivoted inwards slides over the circumference of the projection 48 when the switching wheel is rotated in the direction indicated by an arrow 50. Around the projection 48 a spiral guide wall 51 is formed on the switching wheel 14 at a comparatively large distance. When the detection means detects tape stoppage this guide wall 51 can also cooperate with the pin 49 on the switching member 46. The pin 44 then no longer pushes against the switching fork 45, so that the pin 49 on the switching member 46 is no longer moved inwards towards the projection 48 but remains in the same position and, as the switching wheel 14 continues to rotate in the direction indicated by the arrow 50, reaches the outer side of the guide wall 51. Since the guide wall 51 is spiral-shaped the switching member 46 will be pivoted clockwise about the pivot 47, so that the switching member 46 is urged against a connecting member 52.

Figures 2A, 2B:
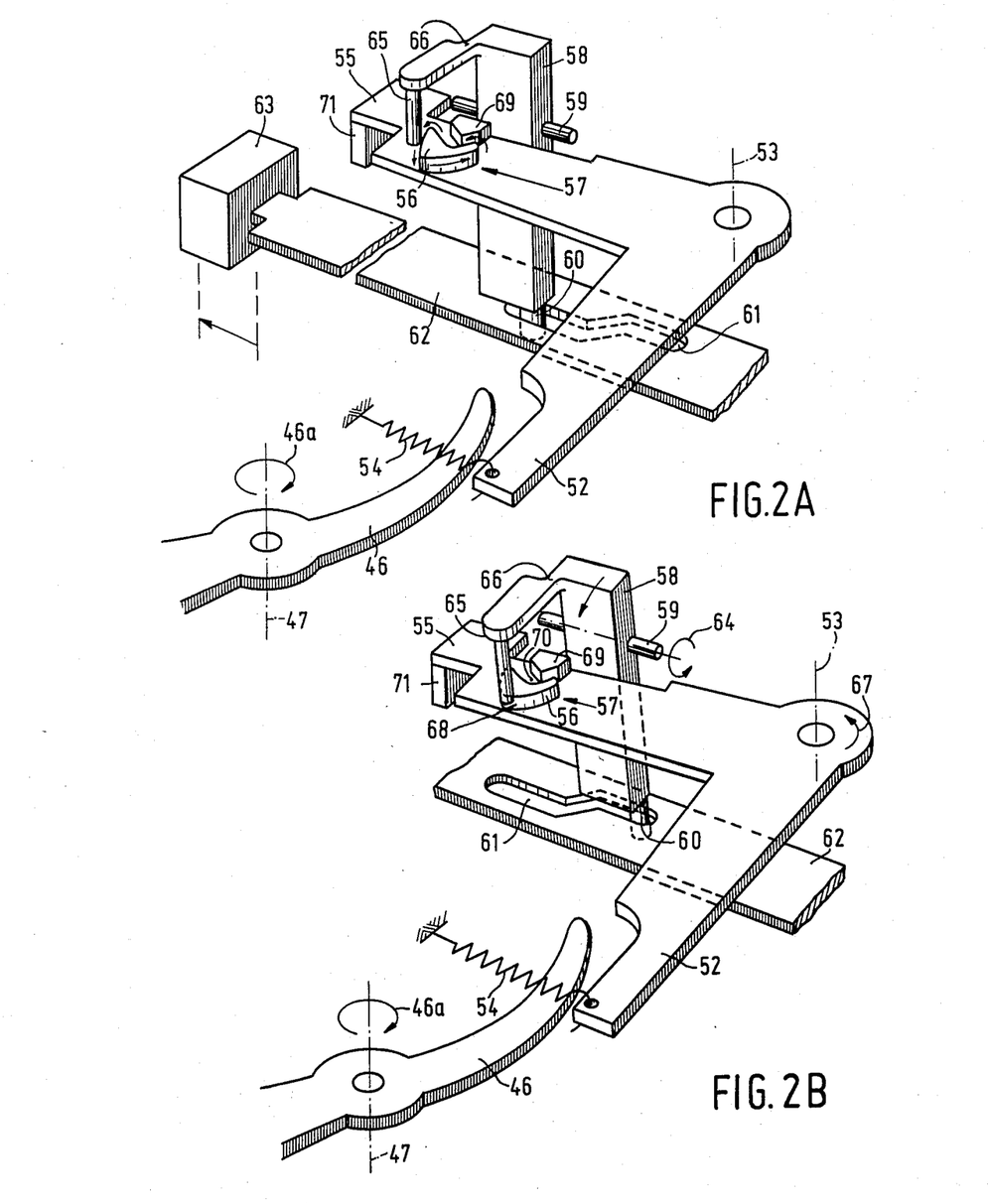
FIG. 2A is a perspective view, on an enlarged scale, of a latching mechanism of the apparatus in a first position.
FIG. 2B shows the latching mechanism shown in FIG. 2A in a second position.

The connecting member 52 is pivotable about a pivot 53 and is formed as a lever having two arms. As can be seen in FIGS. 2A and 2B, the connecting member 52 is spring-biased in the clockwise direction by a spring 54. Thus, the movement of the switching member 46 tensions the spring 54.

The lever arm 55 of the connecting member 52, which arm is remote from the point of engagement with the switching member 46, carries a heart-shaped projection 56 which forms part of a latching mechanism 57. The latching mechanism 57 also comprises a latching lever 58, which can be pivoted relative to the frame about a spindle 59. The spindle 59 extends parallel to the upper surface of the frame 1 and to an imaginary connecting line a between the capstans 9 and 10. The latching lever 58 carries a guide pin 60 on its side which faces the heart-shaped projection 56. The pin 60 extends through a guide slot 61 in an actuating rod 62 of a stop-/eject button 63. The guide slot 61 has such a shape that the latching lever 58, as can be seen in FIG. 2B, is pivoted about the spindle 59 in the direction indicated by an arrow 64 when the stop/eject button is released. The outward movement of the stop/eject button 63 and the rod 62 is caused, in a manner not shown, by inserting a magnetic-tape cassette into the apparatus. FIG. 2A shows the rod 62 in the inward position and FIG. 2B the rod 62 in the outward position.

The latching lever 58 carries a latching pin 65, which can engage with and pass around the heart-shaped projection 56, the pin 65 being connected to the lever 58 by, for example, an integral hinge 66. In FIG. 2A the pin 65 is pivoted out of the area where it can engage with the heart-shaped projection 56, because the rod 62 is depressed. In FIG. 2B, in which the actuating rod 62 has moved to another position, the pin 65 is positioned in the area where it can engage with the heart-shaped projection 56. The pin 65 can then cooperate with the heart-shaped projection 56 when the switching member 46 pivots the connecting member 52 in the counter-clockwise direction indicated by an arrow 67, as shown in FIG. 2B. During this pivotal movement the pin 65 moves past a side wall 68 of the heart-shaped projection 56. A guide 69 ensures that the pin 65 engages with a recess 70 in the heart-shaped projection 56.

The lever arm 55 also has a limb 71 at the end of the arm. As can be seen in FIGS. 3 and 4, this limb 71 cooperates with a spring means formed by a blade spring 72 and is guided in a slot 73 in the frame 1. With its free ends the blade spring 72 acts against members 76 and 77 which are pivotally journalled in the head-mounting plate 74. At its center the head-mounting plate 74 carries a magnetic audio head 75 and on each side of the audio head 75 one of the members 76, 77 in which the pressure rollers 78, 79 are journalled. The members are urged against stops 74a and 74b on the head-mounting plate 74 by the spring force of the blade spring 72.

The head-mounting plate 74 has angular end-portions 80, 81. The end portion 80 is formed with a slot 82, in which a pin 83 mounted on the pivotal arm 16 is movable. Thus, in the position shown in FIG. 3, the pivotal arm 16 has pivoted about the spindle 15 in such a manner that the switching wheel is in mesh with the play wheel 25 and the gear wheel 12. In a similar way FIG. 4 shows that the end portion 81 of the head mounting plate 74 has pivoted the pivotal arm 19 about the spindle 18, so that the gear wheel 17 is in mesh with the play wheel 24 and the gear wheel 11. Moreover, in the position shown in FIG. 3 the pressure roller 79 is urged against the capstan 10, while in the position shown in FIG. 4 the pressure roller 78 is urged against the capstan 9.

In the head-mounting plate 74 slots 84, 85 are formed, extending parallel to the connecting line between the capstans 9, 10. Guide pins 86, 87 are movable in these slots.

Figure 5:
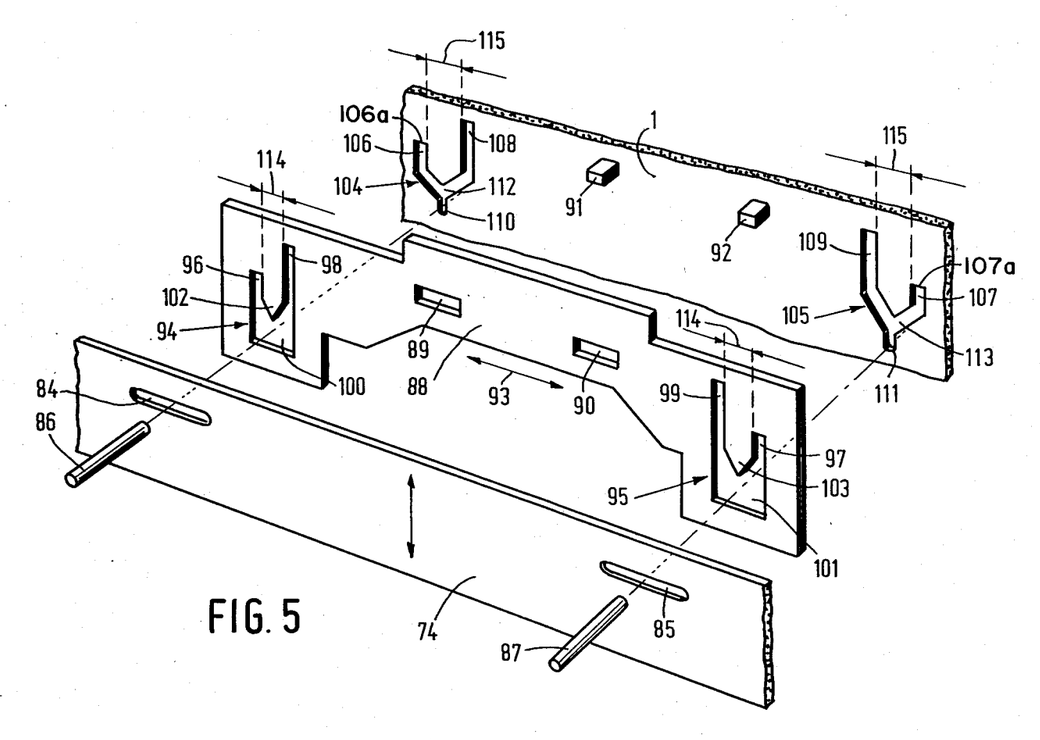
FIG. 5 is an exploded view which shows how a guide-slot system cooperates with control means and a head-mounting plate.

The exploded view in FIG. 5 shows the guide pins 86, 87 which are guided in the slots 84, 85 in the head-mounting plate 7. Thus, the guide pins can be moved parallel to the connecting line a between the capstans. How the guides 86, 87 are retained in the head-mounting plate 74 is not shown. A simple construction is to secure the guide pins to a cap in the same way as the pin of a thumbtack. However, alternatively, the guide pins may be arranged on the free ends of resilient tongues which are secured to the head-mounting plate 74.

A control plate 88, which serves as the control means, is arranged between the head-mounting plate 74 and the upper side of the frame 1. This control plate 88 is formed with longitudinal slots 89, 90 through which projecting guides 91, 92 on the chassis plate extend. As a result, the control plate 88 is movable parallel to the imaginary connecting line a between the capstans 9, 10. In FIG. 5 this movement is indicated by a double arrow 93.

On both ends of control plate 88 respective U-shaped slots 94, 95 are formed disposed mirror-symmetrically relative to each other. The U-shaped slots 94 and 95 each have a short leg 96, 97 and a long leg 98, 99. The short legs are remote from each other and the long legs are disposed closer to each other. The connecting portions 100 and 101 between the short and the long legs are substantially wider. Between the long and short legs tongues 102 and 103 are formed, having pointed ends which face the connecting portions 100, 101.

Bifurcated or fork-shaped guide slots 104 and 105, which constitute a guide-slot system and which are disposed mirror-symmetrically relative to each other, are formed in the frame 1. The slots 104, 105 each comprise two branches corresponding to the fork tines, one branch 106, 107 terminating in a stop edge 106a, 107a, and being shorter than the other branch 108, 109. Again the short branches of the slots are remote from each other and the long branches are disposed closer to each other. A central run-in branch 110, 111 opens into the a V-shaped fork base 112, 113 of the guide slots 104, 105. The distance 114 between the legs of the U-shaped guide slots 94, 95 in the control plate 88 is smaller than the distance 115 between the lateral branches of the bifurcated guide slots 104, 105.

Figure 6:
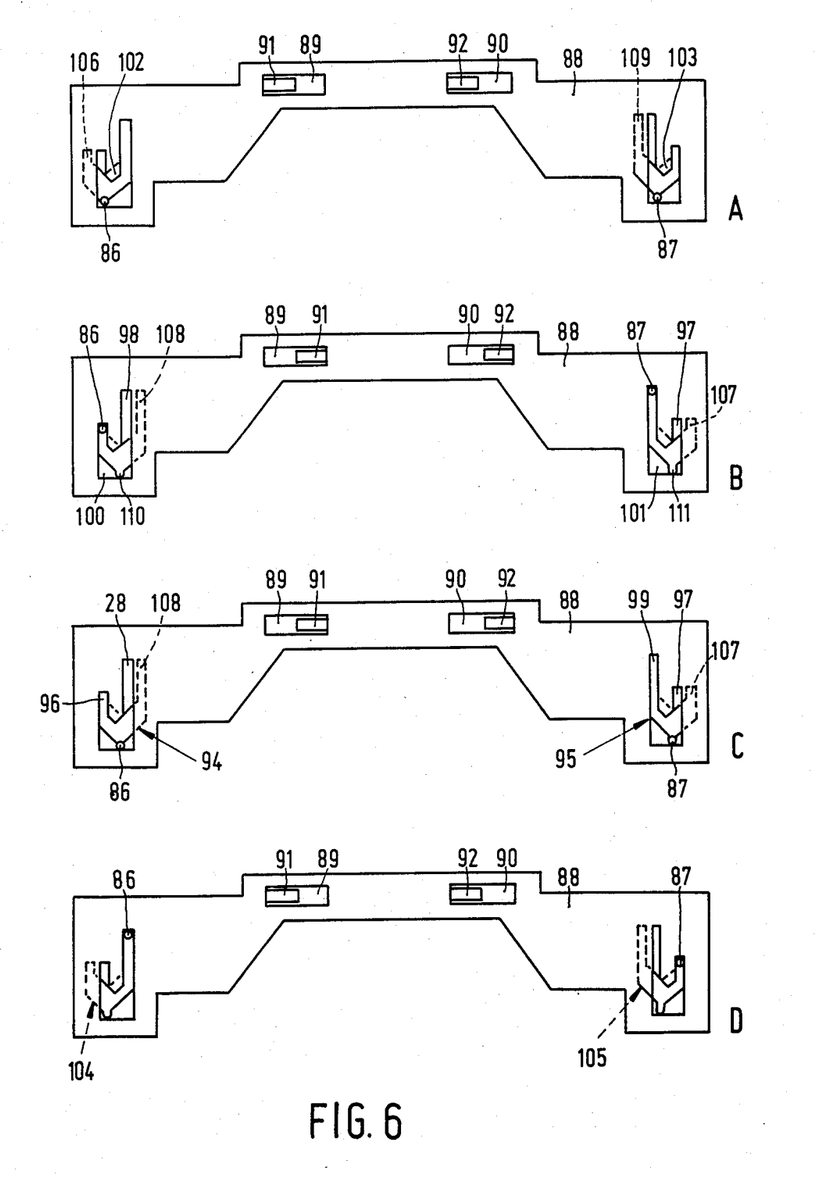
FIG. 6 shows the various positions of a control plate for controlling the guide-slot system and the head-mounting plate.
Figure 7:
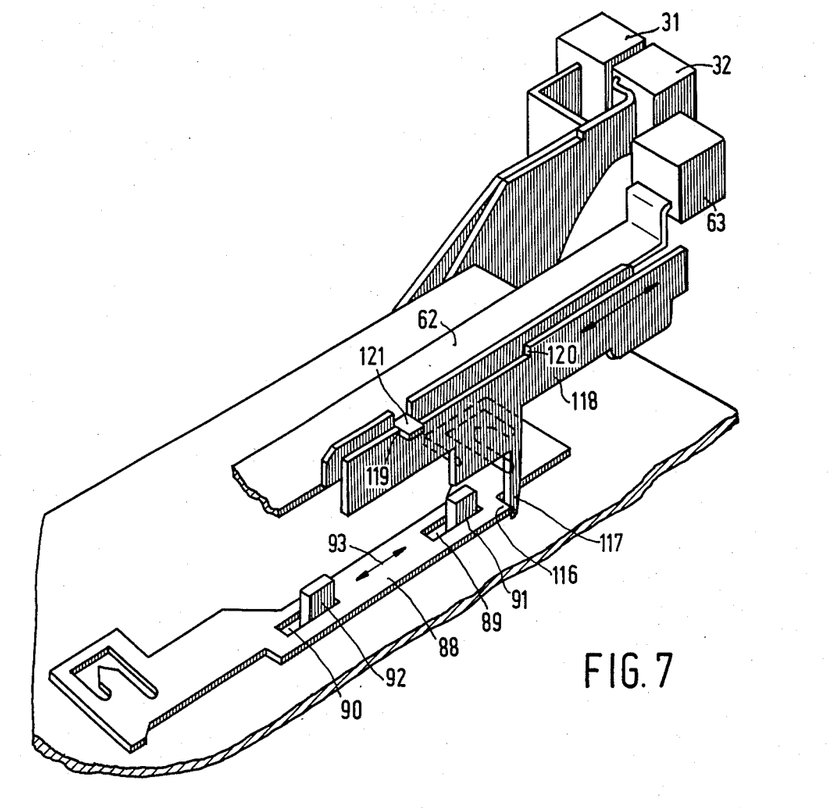
FIG. 7 is a perspective view of the control plate and a stop button which cooperates with this plate to define a preferred tape-transport direction.

FIG. 7 is a perspective view of the control plate 88 showing its connection to other parts. The control plate 88 has a stop edge 116 which a projection 117 of an intermediate slide 118 can abut. The slide 118 can be moved parallel to the imaginary connecting line a between the capstans 9 and 10. The intermediate slide 118 is provided with two stops 119, 120, between when an actuating member or tab 121 on the stop-button rod 62 moes. The rod 62 also serves as ejector, for which movement it is urged by the actuating number 121. If the stop-eject button 63 is moved outwards by the rod 62 it has moved the intermediate slide 118 outwards because the actuating member 121 has abutted with the stop 120. As a result of this, the projection 117 moves away from the stop 116. Thus, the control plate 88 can move freely in the direction indicated by the double arrow 93 in FIGS. 5 and 7. However, when the stop-/eject button 63 is depressed the actuating member 121 abuts with the stop 119 and the projection 117 abuts with the stop 116. This defines a preferred position of the control plate 88 as shown in FIG. 6B.

The device operates as follows. When a cassette is inserted the stop/eject button 63 moves from the position shown in FIG. 2A to the position shown in FIG. 2B. In a manner, not shown, the electrical switch of the motor 3 is closed and the motor is started. As a result, the flywheels 7 and 8 begin to rotate in opposite directions. At the same time the gear wheels 11 and 12 are rotated, so that the gear wheels 14 and 17 with which they cooperate respectively are also rotated.

As a result of the movement of the stop/eject button 62 the latching lever 58 is pivoted about the spindle 59, as shown in FIG. 2A, and the latching pin 65 is positioned in the area of engagement with the heart-shaped projection 56, as shown in FIG. 2B.

As the gear wheels 14 and 17 are not in mesh with the gear wheels 24 and 25, the two winding spindles 20 and 21 are not driven. The discs 41 and 42 are coupled to the windings spindles 20, 21 through separate slipping clutches and are therefore also stationary. Since no torque is exerted on the switching members 46 when the cassette is inserted, because the reels do not rotate and there is no tape transport, the switching member 46 remains in the position shown in FIG. 1 and the pin 49 is moved against the outer side of the guide wall 51. As a result, the switching member 46 is moved in a clockwise direction, as indicated by the arrow 46a, and the connecting member 52 is pivoted counterclockwise, as indicated by the arrow 67. Since the latching lever 58 has pivoted and the pin 65 is positioned in the area of engagement with the heart-shaped projection 56, the pin 65 now travels along the wall 68 of the heart-shaped projection 56 and engages the recess 70. Thus, the connecting member is latched in a pivotal position (see FIG. 2B).

Owing to the pivotal movement of the connecting member 52 in the counterclockwise direction indicated by the arrow 67, the limb 71 has moved inwards and is urged against the blade spring 72. The blade spring in its turn acts against the head-mounting plate 74 through the members 76 and 77 and tends to urge this plate towards to the capstans 9, 10. Now the action of the control plate 88 manifests itself.

Prior to the inward pivotal movement of the limb 71 the head-mounting plate 74 is clear of the capstans. As a result, the guide pins 86, 87 have engaged the run-in branches 110 and 111 (see FIG. 5). The control plate 88 has assumed the position shown in FIG. 6A. When the head-mounting plate 74 is moved towards the capstans 9, 10 the guide pins 86, 87 move forwards and abut with the left-hand sides of the tongues 102, 103 to run into the left-hand branches 106 and 109 of the guide slots 104, 105. The left-hand guide pin 86 is then retained in the shorter branch, while the right-hand guide pin 87 can move freely towards the capstan 10 (see FIG. 6B). As a result of this, the advanced head-mounting plate 74 swings forwards towards the right, in such a way that the right-hand pressure roller 79 is applied to the right-hand capstan 10. The other capstan remains free. Consequently, the tape runs in the direction indicated in FIG. 3.

When the end of the tape is reached the tape stops. As a result, the switching member 46 with the pin 49 is again pivoted in the clockwise direction and the connecting member 52 is again pivoted counterclockwise (FIG. 2B) in the direction indicated by the arrow 67. During this movement the connecting number 52 is pivoted beyond the normal travel obtained when it is in its latched position. This overtravel is possible because the limb 71 acts against the blade spring 72 on the head-mounting plate 74 and thus has room for a movement towards the head-mounting plate. During this overtravel the pin 76 leaves the recess 70 and the latching mechanism 57 is released. Under the influence of the spring 54 the released connecting member 52 is now pivoted clockwise, so that the limb 71 moves outwards. In this position the head-mounting plate has moved away from the cassette and the guide pins 86, 87 again engage the run-in branches 110, 111. The control plate 88 remains in its last position. The tongues 102 and 103 thus remain in a position which is shifted to the left relative to the center of the run-in branches 110 and 111 (FIG. 6C).

Now the reversal of the tape-transport direction begins. The switching wheel 14 continues to rotate. Since the head-mounting plate 74 has moved backwards its end portion 80 has moved outwards and thereby moved the pivotal arm 16 in such a way that the switching wheel 14 is no longer in mesh with the play wheel 25. The detection means 40 then detect tape stoppage. Again the switching member 46 is pivoted clockwise. The switching member 46 presses against the connecting member 52 and pivots the latter again counterclockwise in the direction indicated by the arrow 67. As a result, the pin 65 again cooperates with the heart-shaped projection 56 and finally engages the recess 70, thereby latching the connecting member 52. The limb 71 has now moved forwards again and the head-mounting plate 74 occupies the position shown in FIG. 4 after the forward movement. Via the end portion 81 of the head-mounting plate 74, the gear wheel 17 comes into mesh with the gear wheel 11 and with the play wheel 24. In this position shown in FIG. 4, the pressure roller 78 is applied to the capstan 9 and the tape runs in the opposite direction.

The reversal of the direction of tape transport is achieved by means of the system of guide slots which is shown in various positions in FIG. 6. The last position described is the position shown in FIG. 6C. In this position the control plate 88 has been moved to the left and the guide pins 86, 87 engage the run-in branches 110 and 111. Since the head-mounting plate 74 is moved forwards again, the guide pins 86, 87 are also moved forwards and abut with the right-hand oblique surfaces of the pointed tongues 102 and 103. Consequently, the guide pins 86, 87 are moved to the right and move further into the branches 108 and 107. The transverse movement of the guide pins 86, 87 is possible owing to the sliding movement of the guide pins 86, 87 in the slots 84, 85. When the guide pins 86, 87 engage with the branches 107 and 108 these pins have moved the control plate 88 so far to the right that the branches and legs 108, 98 and 107, 97 coincide. As a result of this, the tongues 102, 103 are positioned so that when the guide pins again move backwards and forwards they can abut the left-hand oblique surfaces of the tongues 102 and 103. This position of the system of guide slots is shown in FIG. 6D. The guide pin 87 is retained in the shorter branch 107 and leg 97, which prevents the head-mounting plate 74 from moving further to the right. On the left-hand side the guide pin 86 can move freely in the branch 108 and leg 98, so that on the left-hand side of the head mounting plate 74 the spring 72 can urge the pressure roller 78 against the capstan 9. This position is shown in FIG. 4. It is to be noted that, while maintaining the effective operation, the short legs and branches of the slots 94, 95 and 104, 105 may be arranged, in a manner not shown, near the facing sides of the slots and the long legs and branches near the sides which are remote from each other.

Figure 8:
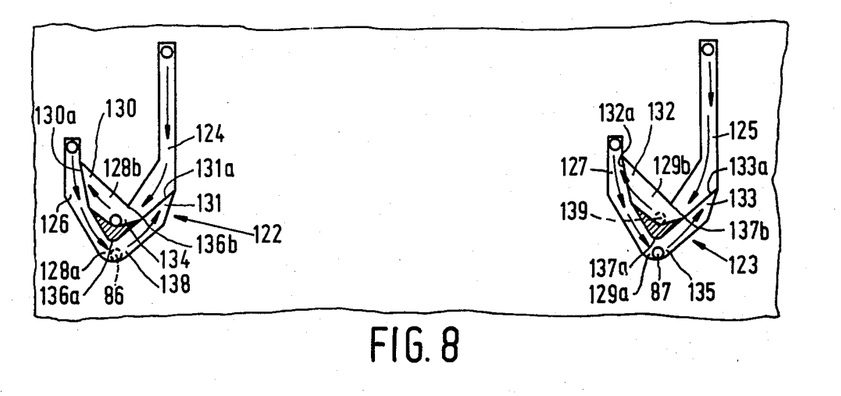
FIG. 8 shows a different guide-slot system and control means for pivoting the head-mounting plate of the apparatus in a second embodiment.

FIG. 8 shows a derived version of the guide-slot system and the control means. The guide-slot system comprises U-shaped grooves 122, 123 formed in the frame 1. The U-shaped grooves again cooperate with the guide pins 86, 87. The U-shaped grooves 122 and 123, in a similar way as in the versions shown in FIGS. 5 and 6, comprise long legs or branches 124, 125 and short legs or branches 126, 127. The connecting portions between the respective legs or branches are formed as double grooves 128a, 128b and 129a, 129b. Near these double grooves 128 and 129 there are provided guide surfaces 130, 131 and 132, 133 which serve as control means. The guide surfaces 130–133 are formed as oblique surfaces which gradually ascend from the bottom of the grooves until they terminate in the guide portions 130a, 131a, 132a and 133a. These guide portions also belong to the control means for the guide pins 86 and 87.

The guide slot systems and control means shown in FIG. 8 operate as follows. It is assumed that the head-mounting plate 74 is withdrawn relative to the cassette. In this initial position the guide pin 86 is situated in the recess 134 of the upper double groove 128b. The guide pin 87 is situated in a recess 135 of the lower double groove 129a. Above the guide pins 86 and 87 the walls of the grooves 128b and 129a are provided with guide points 136b and 137a, respectively. These guide points are offset relative to the centers of the guide pins 86, 87, to the left for the lower groove and to the right for the upper groove. Thus, if the head-mounting plate 74 is moved forwards again the guide pins can only move to the left along the guide surface 130 for the upper groove and to the right along the guide surface 133 for the lower groove. This means that during this movement the guide pin 86 moves into the shorter leg or branch 126 and the guide pin 87 into the longer leg or branch 125. Thus, the guide pin 86 meets a stop after a short travel, while the guide pin 87 can move freely. This corresponds to the position of the head-mounting plate 74 as shown in FIG. 3. If the head-mounting plate 74 is moved back to the initial position, the guide pin 86 moves through the leg or branch 126 into the lower groove 128a and the guide pin 87 into the upper groove 129b. In the fully withdrawn position of the head-mounting plate the guide pin 86 therefore engages a recess 138 and the guide pin 87 engages a recess 139, which is indicated by broken lines in FIG. 8. If the head-mounting plate is again moved towards the capstans the guide pin 86 moves towards the guide surface 131 in the long branch 124 as a result of the presence of a guide point 136a. The guide pin 87 moves towards the guide surface 132 in the short branch 127 owing to the presence of a guide point 137b. This means that in the present case the guide pin 87 meets a stop in the short branch 127 after a short travel, while the guide pin 86 can move freely in the branch 124. The head-mounting plate then assumes a position as shown in FIG. 4. When the head-mounting plate 84 is withdrawn again the guide pins 86 and 87 return to the initial position described above.

The advantage of this guide-slot system is that no movable parts are required for controlling the guide pin movement. The grooves, guide surfaces and guide portions can be injection-molded in the frame from a plastic material.

What is claimed is:

1. A magnetic-tape-cassette apparatus comprising:
   a frame,
   a pivotable head-mounting plate,
   at least one magnetic head and two pressure rollers mounted on said plate, and
   means for transporting a magnetic tape, contained within a cassette which has been inserted in the apparatus, in a selected one of two opposite directions of tape transport past said at least one head, said means comprising first and second capstans disposed substantially parallel to each other and defining a capstan connecting line; said two pressure rollers being each associated with a respective capstan, arranged such that a controlled pivoting movement of the plate towards said line positions a selected one of said rollers, responsive to the direction of pivoting, against the respective capstan, thereby defining the direction of tape transport,
   characterized by comprising a guide slot system having first and second slot portions, each portion including a respective guide slot having a guide slot branch, each said branch having a respective stop edge; and a guide pin system having first and second portions each including a respective pin, each pin engaging and being guided in a respective guide slot; one of said systems being arranged on said frame, with the first and second portions of said one system being disposed, with respect to the direction of tape transport, to respective first and second sides of said magnetic head; the other of said systems being arranged on the head mounting plate, with the first and second portions of said other system being disposed respectively, with respect to the direction of tape transport, to said first and second sides of the magnetic head; and means, responsive to one of said pins being in the respective guide slot branch at the beginning of a cycle of movement of the head-mounting plate away from said line and back toward said line, for causing relative movement between said guide slot system and said guide pin system in a direction parallel to the direction of tape transport, during said cycle, such that upon subsequent movement of the plate towards said line during said cycle the other of said pins undergoes relative movement in its respective guide slot branch to abut the stop edge, said edge blocking further relative travel of said other pin; and as a result of the blocking of relative travel, further movement of said plate towards said line causes pivoting of said plate such that the pressure roller associated with the other side of the magnetic head moves towards its respective capstan and controls the tape transport in the other direction.

2. An apparatus as claimed in claim 1, characterized in that said guide pins are mounted in longitudinal slots in the head-mounting plate so as to be movable parallel to the capstan connecting line.

3. An apparatus as claimed in claim 2, characterized in that said system of guide slots comprises at least two bifurcated slots, each bifurcated slot having one branch shorter than the other, and a central run-in branch communicating with each of the other branches, and said bifurcated slots are arranged so as to be mirror-inverted with respect to the direction of tape transport.

4. An apparatus as claimed in claim 1, characterized in that said system of guide slots comprises at least two bifurcated slots, each bifurcated slot having one branch shorter than the other, and a central run-in branch communicating with each of the other branches, and said bifurcated slots are arranged so as to be mirror-inverted with respect to the direction of tape transport.

5. An apparatus as claimed in claim 4, characterized in that said control means comprises a control plate mounted to be movable parallel to said capstan connecting line between two end positions; said control plate comprises at least two U-shaped guide slots, one disposed to each side of said head;

said slots being arranged, and said plate being so movable, that said U-shaped guide slots can be at least partly aligned with a respective bifurcated slot; legs of each U-shaped slot being spaced apart a distance less than the spacings of the branches of the respective bifurcated slot; and pointed tongues disposed between the legs of the respective legs of said U-shaped slots for alternately positioning the guide pins in the short or long branches of the bifurcated slots, said tongues being offset laterally relative to the run-in branches when the control plate is in either end position.

6. An apparatus as claimed in claim 3, characterized in that said control means comprises a control plate mounted to be movable parallel to said capstan connecting line between two end positions; said control plate comprises at least two U-shaped guide slots, one disposed to each side of said head;

said slots being arranged, and said plate being so movable, that said U-shaped guide slots can be at least partly aligned with a respective bifurcated slot; legs of each U-shaped slot being spaced apart a distance less than the spacings of the branches of the respective bifurcated slot; and pointed tongues disposed between the legs of the respective legs of said U-shaped slots for alternately positioning the guide pins in the short or long branches of the bifurcated slots, said tongues being offset laterally relative to the run-in branches when the control plate is in either end position.

7. An apparatus as claimed in claim 6, characterized in that said control plate has at least one stop, and the apparatus comprises a stop button and an actuating rod connected to said button; said rod including a projection arranged such that, upon actuation of the stop button, the respective projection abuts the respective stop and always moves the control plate into one of the end positions.

8. An apparatus as claimed in claim 5, characterized in that said control plate has at least one stop, and the apparatus comprises a stop button and an actuating rod connected to said button; said rod including a projection arranged such that, upon actuation of the stop button, the respective projection abuts the respective stop and always moves the control.plate into one of the end positions.

9. An apparatus as claimed in claim 1, characterized in that said guide slot systems comprise U-shaped grooves formed in said frame, each U-shaped groove having a short and a long branch, and a portion formed as a double groove connecting the branches, and the control means comprises guide surfaces on the bottoms of the U-shaped grooves; said grooves being upwardly inclined with respect to the bottoms thereof, and terminating in guide portions arranged such that after each withdrawal and subsequent forward movement of the head-mounting plate towards the capstan connecting line, said guide portions allow the respective pins to move only through one of the connecting grooves from the short branch into the long branch; and during the next backward and forward movement, to move through the other connecting groove from the long branch into the short branch, said short and long branches being arranged relative to each other such that upon each backward and forward movement of the head-mounting plate one of the guide pins moves into a short branch while the other guide pin moves into the respective long branch; and during a subsequent backforward and forward movement, said guide pin moves into the long branch and the other moves into the short branch.

10. An apparatus as claimed in claim 9, characterized in that said guide pins are mounted in longitudinal slots in the head-mounting plate so as to be movable parallel to the capstan connecting line.

* * * * *